J. W. HEATHCOTE.
CREAM SEPARATING APPARATUS.
APPLICATION FILED JUNE 25, 1908.
940,686.
Patented Nov. 23, 1909.
3 SHEETS—SHEET 1.
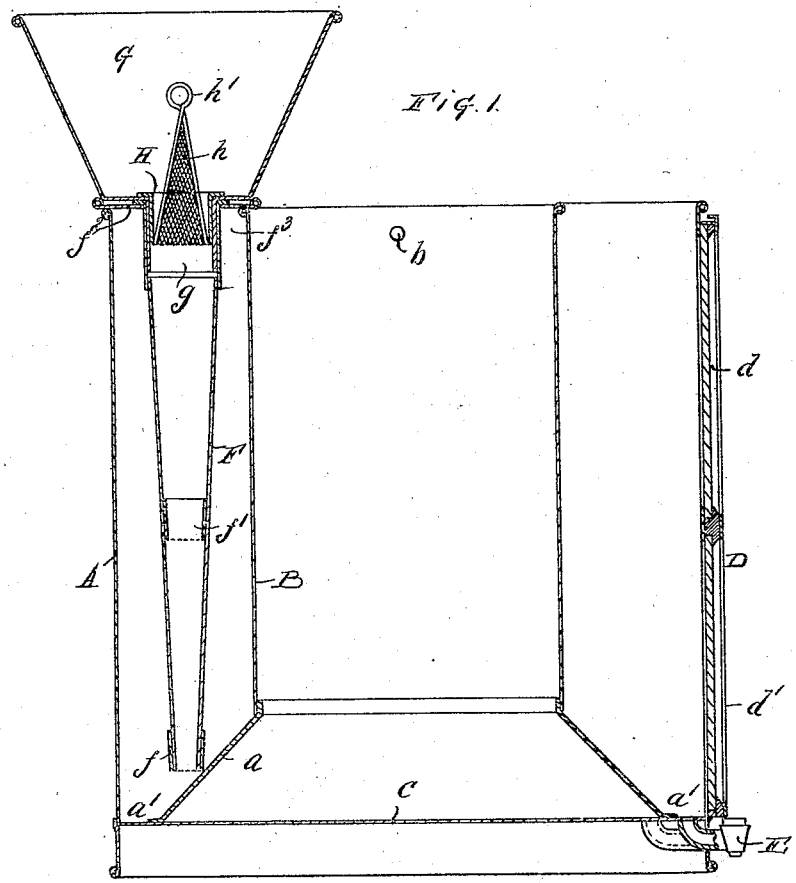
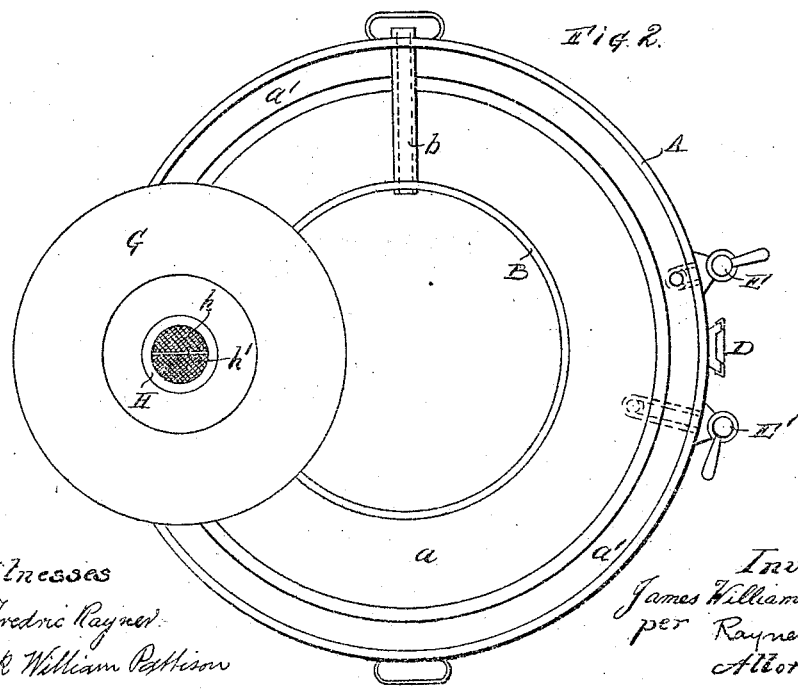
Witnesses
George Fredric Rayner
Frank William Pattison
Inventor
James William Heathcote
per Rayner & Co.
Attorneys

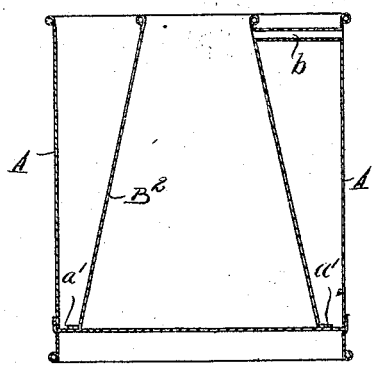
Fig. 1.a.
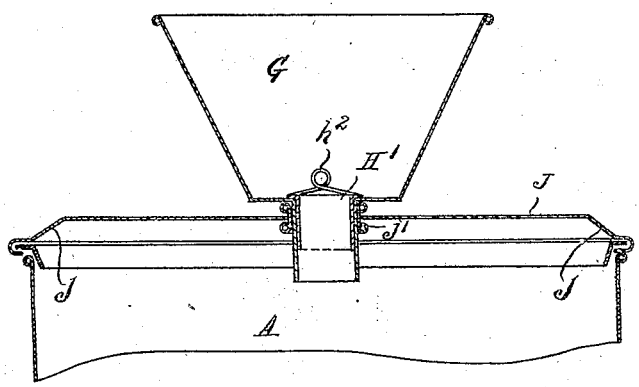
Fig. 3.
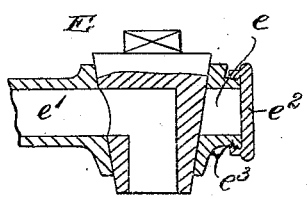
Fig. 6.

J. W. HEATHCOTE.
CREAM SEPARATING APPARATUS.
APPLICATION FILED JUNE 25, 1908.
940,686.
Patented Nov. 23, 1909.
3 SHEETS—SHEET 3.
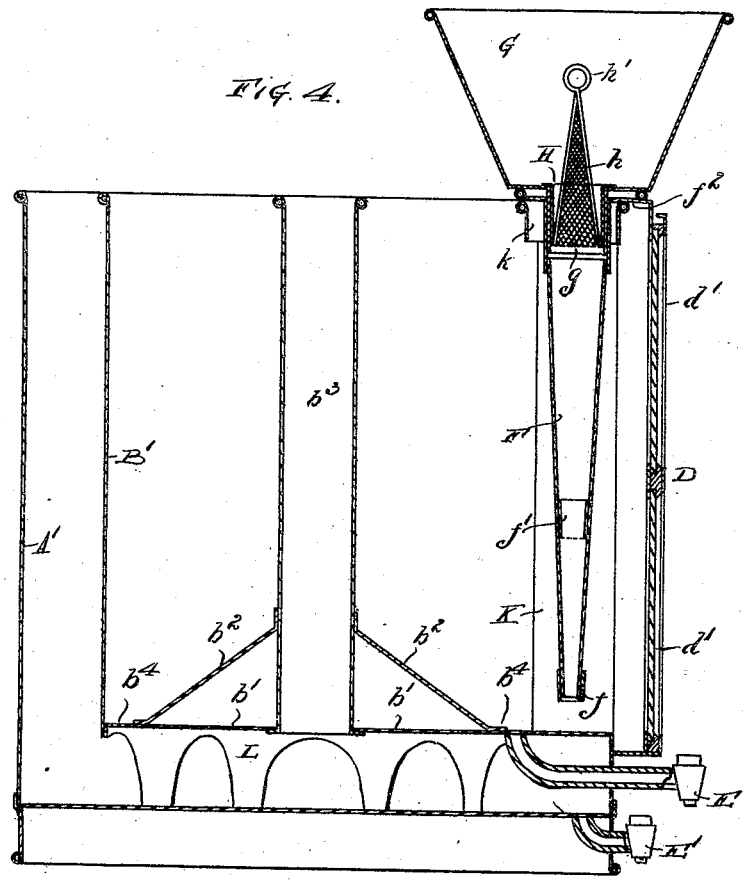
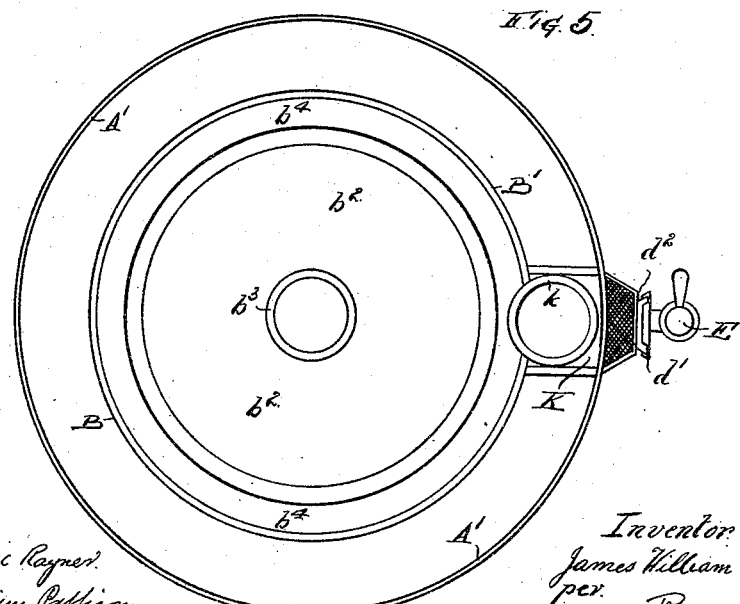

UNITED STATES PATENT OFFICE.

JAMES WILLIAM HEATHCOTE, OF HEATHERLEE, CAPE COLONY.

CREAM-SEPARATING APPARATUS.

940,686.  Specification of Letters Patent.  Patented Nov. 23, 1909.

Application filed June 25, 1908. Serial No. 440,356.

*To all whom it may concern:*

Be it known that I, JAMES WILLIAM HEATHCOTE, a subject of the King of Great Britain and Ireland, residing at Heatherlee, Engcobo, Cape Colony, South Africa, have invented certain new and useful Improvements in Cream-Separating Apparatus, of which the following is a specification.

This invention relates to improvements in the construction of cream separators which enable the complete separation of the cream from the milk to be readily effected.

The apparatus consists of a double cylindrical vessel, in the annular space of which either milk or cooling water is placed, while the water or milk, according to the type of separator employed, occupies the inner cylinder. In either case the milk chamber has a conical or bell shaped bottom with a flat horizontal edge so that the chamber is reduced toward the bottom and on the discharge of the separated milk the cream lying on top descends on the conical surface, driving the milk before it into the contracted space. The whole of the milk is thus driven out before the cream begins to escape. A protected window in the side of the vessel allows the cream and milk to be observed at any stage. Where the milk is in the inner chamber an extension or channel at one side passes to the outer cylinder wall, where the observation window is situated, and the milk is poured in at this channel so that in each case the milk enters in the space between the two cylinders and the water cools it at the bottom and along the whole vertical surface of the cylinder. The milk is poured in through a long detachable funnel or delivery tube fitted with a set of strainers at various points as hereinafter described.

In order that my invention may be more readily understood, reference is had to the accompanying sheet of drawings in which:—

Figure 1 is a vertical section of one form of my improved separator; Fig. 2 is a plan; Fig. 3 is a section of the top showing the method of pouring in the cooling water; Fig. 1$^a$ illustrates diagrammatically a slightly modified form of the milk and water container; Figs. 4 and 5 are respectively a vertical section and a plan of a modification; and Fig. 6 is a detail view of an improved tap or cock.

Referring to Figs. 1, 2 and 3, A is the outer cylinder, which in this case receives the milk to be separated. The inner cylinder B extends to the top of the conical or bell shaped bottom $a$ of the milk container and this conical bottom terminates a little inside the outer cylinder, leaving the milk chamber with an annular flat bottom $a^1$ of about an inch in width, formed by the outer edge of the bottom C of the whole apparatus. The inspection window D is fitted at one side of the cylinder A and consists of a long glass strip secured in a frame $d$ and covered with a projecting slotted slide $d^1$, which can be readily slid upward over the frame $d$ when the window is to be uncovered for cleaning or repair. The levels of the cream and milk are viewed through the glass and slotted cover, so that the progress at any point is readily observed.

The milk and cream are run out through the tap E connected to the flat bottom $a^1$ and the water through the tap $E^1$ connected to the bottom C inside the cone $a$.

The milk to be separated is poured in through the long funnel or directing tube F extending nearly to the bottom of the vessel, as shown in Fig. 1. This tube has the small strainer $f$ fitted as a thimble at its end and a loose strainer $f^1$ is dropped into it from the top, so that it lies about midway in the conical tube. At the top of the tube is a large flange $f^2$ and a cone $f^3$ which enable it to be safely suspended in the annular chamber between the two cylinders, the flange resting on the tops of both, these being at the same level. Inside the top of the tube F is fitted the lower end $g$ of the funnel G. In the bottom of this is placed the bucket strainer H and in this a conical strainer $h$ resting with its base on the bottom of H. The strainer $h$ has a ring $h^1$ by which it can be readily raised or placed in position. The milk on entering has thus to pass through four successive strainers before it flows into its container.

Fig. 3 shows the arrangement for supplying the cooling water. The cover J is flat except for the conical rim $j$ and at the middle has the ring $j^1$ into which the end of the funnel G extends. A small bucket strainer H$^1$ with handle $h^2$ is dropped into the funnel to keep the water free from impurities. To prevent accidental overflow into the milk chamber a small overflow pipe $b$ leads from the water chamber to the outside of the apparatus.

As shown in the diagrammatic sectional view, Fig. 1ª, the sloping bottom $a$ and the inner cylinder B may be combined in one part by making the inner vessel $B^2$ of conical form throughout so that the annular channel containing the milk decreases continuously from the top to the bottom. This construction is substantially similar to the one already described, but the directing tube would be tilted a little out of the vertical to adapt itself to the altered form.

In the modified form of separator shown in Figs. 4 and 5 the outer cylinder $A^1$ receives the cooling water while the inner cylinder $B^1$ holds the milk. Besides the flat bottom $b^1$ of the inner cylinder there is a conical or tapering bottom $b^2$ extending from the central water supply tube $b^3$ to within a short distance of the side of the cylinder, leaving a flat annular surface $b^4$ corresponding to $a^1$ in Figs. 1 and 2. The cylinder $B^1$ is raised above the bottom of $A^1$ on the support L which allows the water to pass from the tube $b^3$ into the annular space between the two cylinders. The annular space is not complete as it is broken by the milk channel K, consisting of an extension on the inner cylinder to the outer at one side, at which point is placed the inspection window D in a beveled frame $d^2$, corresponding to the frame $d$ of Figs. 1 and 2. The slotted covering plate $d^1$ is also similar to that already described.

At the upper side of the channel K is a ring $k$ to receive the delivery tube F, the milk being poured in at the channel between the two cylinders. In Fig. 5 the funnel and delivery tube are removed to show the cylinder more clearly. The funnel G is applied to the top of the pipe $b^3$ for the water supply for preference through the cover already described with reference to Fig. 3. The cocks E and $E^1$ are for convenience placed in this case one over the other, the upper one projecting so as to clear the lower.

The cocks or taps E are of special construction as shown in the detail view, Fig. 6, the object of this construction being to allow of thorough cleansing, an essential matter in such apparatus. The tap is provided with an opening $e$ at the front connecting with the discharge pipe $e^1$ so as to form a continuous passage which enables the inside of the channel to be thoroughly cleansed by means of a brush or like device, passed through the opening. This opening is closed normally by the small cover $e^2$ screwed on the collar $e^3$, thus preventing the entry of flies or dust.

The apparatus is used as follows: After supplying the cooling water in the manner described the strainers, all of which are detachable, are fitted in the funnel and delivery tube and these are placed between the two cylinders, either in the milk channel as in Figs. 4 and 5 or at any point in the annular space in the apparatus shown in Figs. 1, 2 and 3. The milk of each cow, immediately it is milked, is then poured steadily into the funnel and directly afterward a corresponding quantity of cold water is added, to mix with the milk. This is repeated for each cow until the separator is full, when the funnel and directing tube are removed and the cover is placed on. When separation is complete—usually in from half an hour to an hour—the milk tap E is fully opened and the milk allowed to escape until about three inches of milk remain, when the flow is continuously lessened and the milk allowed only to dribble through at the final stage. When the milk layer reaches the bottom of the window it has completely escaped and the tap is closed and again opened to discharge the cream into another vessel.

What I claim as my invention and desire to secure by Letters Patent is:—

1. A cream separator consisting of two concentric cylinders, the outer containing cooling water and the inner milk, a vertical milk channel opening the inner cylinder to the periphery of the outer, an inspection window in the outer cylinder at the outer edge of the said channel, means for supporting the milk supplying apparatus in the milk channel and a central water supply tube leading through the bottom of the inner cylinder into the outer, substantially as herein described and shown.

2. In a cream separator, a supplying and straining apparatus consisting of a conical delivery tube, a strainer fitted at the lower end, a loose central strainer, means for supporting the tube at the upper end, a funnel fitting the top of the tube, a bucket strainer in the said funnel and a conical strainer placed in the said bucket, substantially as herein described and shown.

In witness whereof I have hereunto set my hand in the presence of two witnesses.

JAMES WILLIAM HEATHCOTE.

Witnesses:
   J. T. FULLER,
   PHILIP J. GRANDIN.